(12) United States Patent
Maeda et al.

(10) Patent No.: US 7,862,915 B2
(45) Date of Patent: Jan. 4, 2011

(54) MAGNETIC RECORDING MEDIUM AND MAGNETIC RECORDING/REPRODUCING APPARATUS

(75) Inventors: Tomoyuki Maeda, Kawasaki (JP); Migaku Takahashi, Sendai (JP); Masahiro Oka, Ichihara (JP)

(73) Assignees: Tohoku University, Miyagi (JP); Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 384 days.

(21) Appl. No.: 11/640,979

(22) Filed: Dec. 19, 2006

(65) Prior Publication Data

US 2007/0141401 A1 Jun. 21, 2007

(30) Foreign Application Priority Data

Dec. 20, 2005 (JP) ............................. 2005-366713

(51) Int. Cl.
*G11B 5/65* (2006.01)
(52) U.S. Cl. .............. 428/831.2; 428/836.2; 428/836.3; 360/131
(58) Field of Classification Search ...... 428/800–848.9; 360/131
See application file for complete search history.

(56) References Cited

U.S. PATENT DOCUMENTS

| 6,183,893 B1 | 2/2001 | Futamoto et al. |
| 6,602,620 B1 * | 8/2003 | Kikitsu et al. ............ 428/842.2 |
| 6,638,648 B2 | 10/2003 | Yamamoto et al. |
| 6,881,504 B2 | 4/2005 | Yamamoto et al. |
| 2003/0091868 A1 * | 5/2003 | Shimizu et al. ........ 428/694 TM |
| 2004/0028950 A1 | 2/2004 | Kanbe et al. |
| 2004/0057157 A1 | 3/2004 | Shimizu et al. |
| 2004/0224184 A1 * | 11/2004 | Hikosaka et al. ...... 428/694 TM |
| 2005/0142387 A1 * | 6/2005 | Araki et al. ............ 428/694 BS |
| 2005/0214588 A1 | 9/2005 | Iwasaki et al. |
| 2007/0072012 A1 * | 3/2007 | Nakamura et al. ........ 428/831.2 |

FOREIGN PATENT DOCUMENTS

| DE | 100 12 414 | 12/2000 |
| JP | 2002-083411 | 3/2002 |
| JP | 2002-109720 | 4/2002 |
| JP | 2003-036525 | 2/2003 |
| JP | 2004-022138 | 1/2004 |
| JP | 2004-146029 | 5/2004 |
| JP | 2005-276363 | 10/2005 |

OTHER PUBLICATIONS

Austrian Search Report dated Feb. 1, 2008 for Appln. No. 200608348-9.
Japanese Office Action dated Mar. 30, 2010 for Appln. No. 2005-366713.

* cited by examiner

*Primary Examiner*—Holly Rickman
*Assistant Examiner*—Linda Chau
(74) *Attorney, Agent, or Firm*—Pillsbury Winthrop Shaw Pittman, LLP

(57) ABSTRACT

According to one embodiment, a multilayered underlayer including a first underlayer containing Cu aligned in a (111) plane and a second underlayer formed on the Cu underlayer and containing Cu and nitrogen as main components is formed.

7 Claims, 8 Drawing Sheets

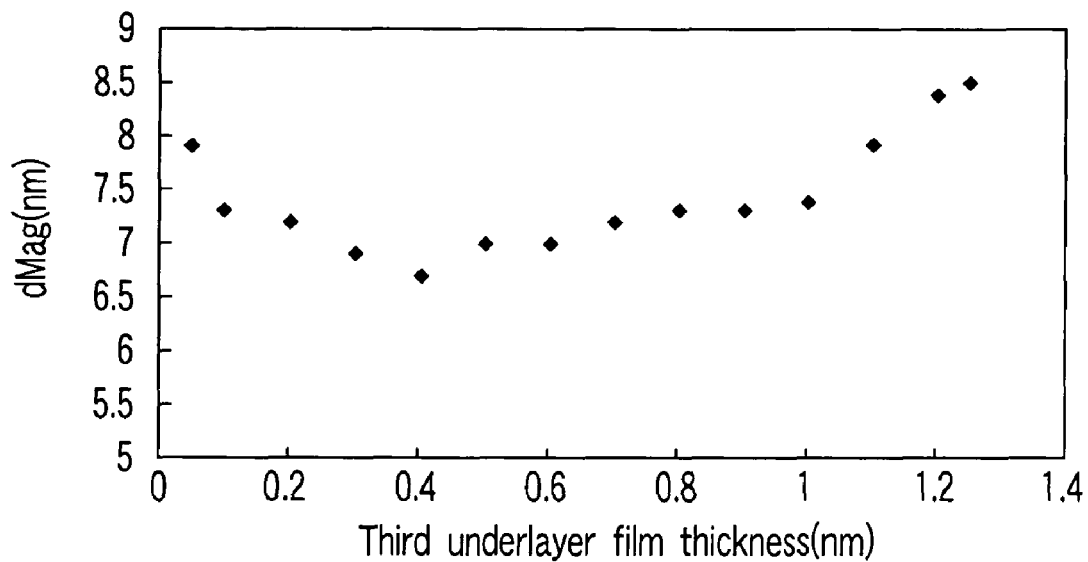
F I G. 11
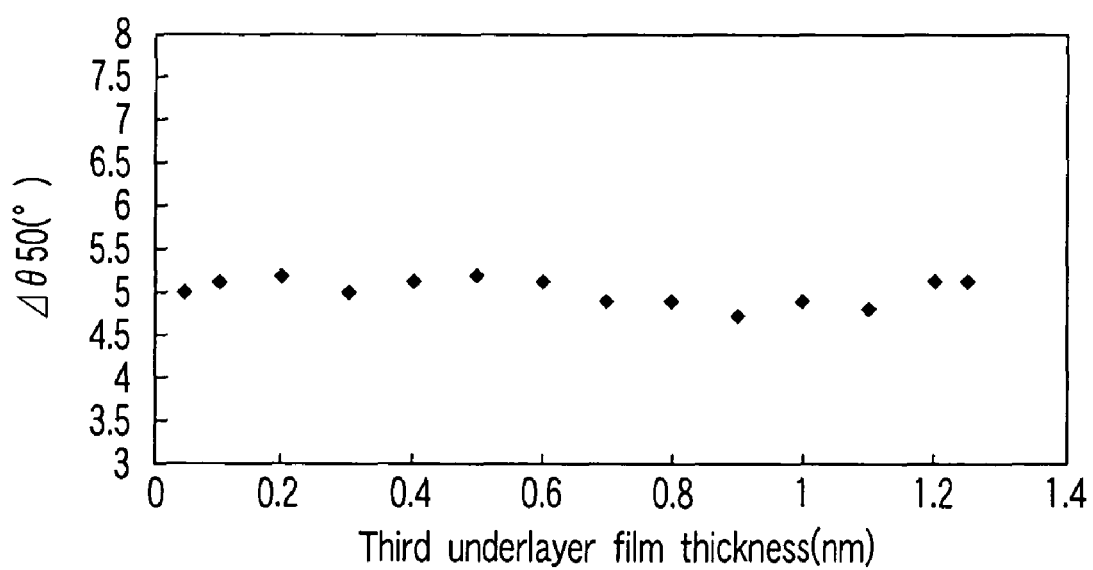
F I G. 12

MAGNETIC RECORDING MEDIUM AND MAGNETIC RECORDING/REPRODUCING APPARATUS

CROSS-REFERENCE TO RELATED APPLICATIONS

This application is based upon and claims the benefit of priority from Japanese Patent Application No. 2005-366713, filed Dec. 20, 2005, the entire contents of which are incorporated herein by reference.

BACKGROUND

1. Field

One embodiment of the invention relates to a perpendicular magnetic recording medium for use in a hard disk drive or the like using the magnetic recording technique and a magnetic recording/reproducing apparatus.

2. Description of the Related Art

A magnetic recording device (HDD) for information recording/reproduction mainly used in computers is used in various fields such as household video decks, audio apparatuses, and car navigation systems because of its large capacity, inexpensiveness, high data access speed, and high data holding reliability. As the range of use of the HDD widens, demands for high storage capacity are increasing, and this has accelerated the competition for the development of a high-density HDD in recent years.

Presently commercially available magnetic recording/reproducing apparatuses use a longitudinal magnetic recording method. In this method, magnetic crystal grains forming a perpendicular magnetic recording layer for recording information have an axis of easy magnetization in a direction longitudinal to a substrate. The axis easy magnetization is an axis in the direction of which magnetization easily points. In a Co-based alloy, the axis of easy magnetization is a direction longitudinal to the normal to the (0001) plane of a hexagonal close-packed structure (hcp) of Co. Decreasing the recording bit area of a longitudinal magnetic recording medium in order to increase the recording density may make the magnetization reversal unit diameter of a recording layer too small. This may worsen the recording/reproduction characteristics by the so-called thermal decay effect which thermally erases information in the magnetic layer. In addition, increasing the density often increases noise produced from the medium by the influence of a demagnetizing field generated in the boundary region between recording bits.

By contrast, in a so-called perpendicular magnetic recording method in which the axis of easy magnetization in a perpendicular magnetic recording layer points in a direction substantially perpendicular to a substrate, the influence of a demagnetizing field between recording bits is small even at high density, and the operation is magnetostatically stable even at a high density. Therefore, the perpendicular magnetic recording method is recently attracting a great deal of attention as a technique which replaces the longitudinal recording method. A perpendicular magnetic recording medium generally comprises a substrate, an alignment control underlayer which aligns magnetic crystal grains in a perpendicular magnetic recording layer in a (0001) plane and reduces the alignment dispersion, the perpendicular magnetic recording layer containing a hard magnetic material, and a protective layer which protects the surface of the perpendicular magnetic recording layer. In addition, a soft magnetic layer which concentrates magnetic flux generated from a magnetic head during recording is formed between the substrate and alignment control underlayer.

To increase the recording density, noise must be reduced with the thermal stability being maintained in this perpendicular magnetic recording medium as well. The noise reduction method is generally a method which decreases the size of the magnetic crystal grains in the recording layer.

An example of the method of reducing this magnetic interaction is a method which adds $SiO_2$ and the like to a perpendicular magnetic recording layer to give it a granular structure formed by magnetic crystal grains and a grain boundary region surrounding the magnetic crystal grains and made of the additives, as described in Jpn. Pat. Appln. KOKAI Publication No. 2002-83411.

Unfortunately, these methods alone cannot sufficiently downsize and magnetically isolate the magnetic crystal grains in the recording layer. In addition to these methods, therefore, there is a disclosed technique which further downsizes the crystal grains in the perpendicular magnetic recording layer by downsizing the crystal grains in the underlayer by adding $SiO_2$ and the like to it, as described in Jpn. Pat. Appln. KOKAI Publication No. 2003-36525.

If a method like this downsizes the crystal grains in the underlayer, however, the crystallinity and alignment of the underlayer crystal grains generally deteriorate. The influence of this deterioration degrades the crystallinity and (0001) alignment of the crystal grains in the perpendicular magnetic recording layer. As a consequence, the signal-to-noise ratio (SNR) decreases.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 11 is a graph showing the relationship between the thickness of a third underlayer and an average crystal grain size dMag;

FIG. 12 is a graph showing the relationship between the thickness of the third underlayer and $\Delta\theta_{50}$;

DETAILED DESCRIPTION

Various embodiments according to the invention will be described hereinafter with reference to the accompanying drawings. In general, according to one embodiment of the invention, a magnetic recording medium of the present invention has a substrate, a soft magnetic layer formed on the substrate, a multilayered underlayer formed on the soft magnetic layer, and a perpendicular magnetic recording layer formed on the multilayered underlayer.

The perpendicular magnetic recording layer contains Co as a main component, and contains crystal grains having a hexagonal close-packed structure substantially aligned in a (0001) plane.

The multilayered underlayer includes a first underlayer containing Cu as a main component and containing crystal grains having a face-centered cubic lattice structure substantially aligned in a (111) plane, and a second underlayer formed on the first underlayer and containing Cu and nitrogen as main components.

A magnetic recording/reproducing apparatus of the present invention has the perpendicular magnetic recording medium described above and a recording/reproducing head.

Note that the term "main component" used in the present invention means a component constituting the largest content of components contained in the material, or a plurality of components whose constituency rank high.

Figure 1:
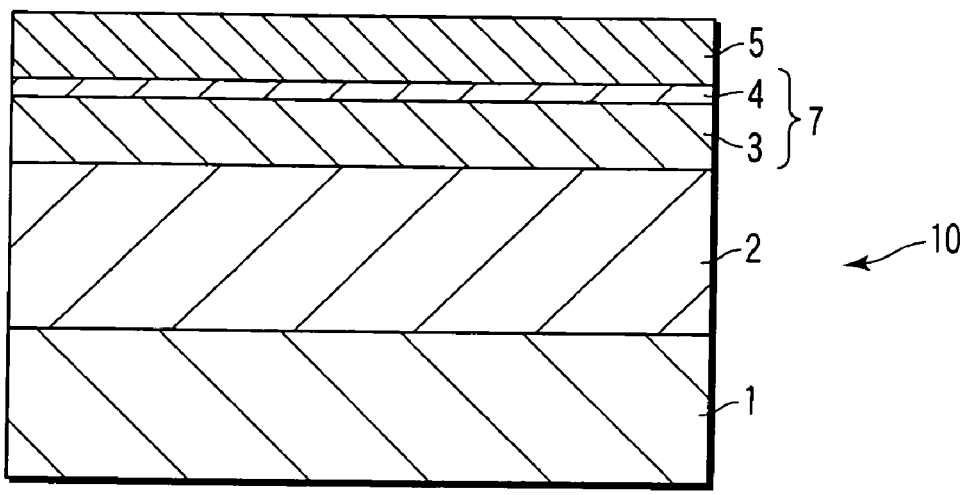
FIG. 1 is a sectional view showing the first example of a magnetic recording medium according to the present invention.

FIG. 1 is a sectional view showing the first example of the magnetic recording medium according to the present invention.

As shown in FIG. 1, a magnetic recording medium 10 has a structure formed by sequentially stacking, on a substrate 1, a soft magnetic layer 2, a multilayered underlayer 7 including a first underlayer 3 and second underlayer 4, and a perpendicular magnetic recording layer 5.

The underlayer 3 contains Cu as a main component, and contains crystal grains having a face-centered cubic lattice (fcc) structure substantially aligned in the (111) plane. The second underlayer 4 contains Cu and nitrogen as main components. The perpendicular magnetic recording layer 5 contains Co as a main component, and contains crystal grains having a hexagonal closest packed (hcp) structure substantially aligned in the (0001) plane.

A layer having a so-called granular structure in which the grain boundary region of a nonmagnetic material surrounds individual magnetic crystal grains can be used as the perpendicular magnetic recording layer of the perpendicular magnetic recording medium of the present invention. The nonmagnetic grain boundary region around the magnetic crystal grains in the perpendicular magnetic recording layer can reduce the exchange interaction between the magnetic crystal grains, thereby reducing the transition noise in the recording/reproduction characteristics.

An alloy material having the hcp structure substantially aligned in the (0001) plane and containing Co as a main component is used as the magnetic crystal grain material of the perpendicular magnetic recording layer. When the Co alloy crystal grains having the hcp structure are aligned in the (0001) plane, the axis of easy magnetization points in a direction perpendicular to the substrate surface. In one embodiment, it is possible to use, e.g., Co—Cr-based and Co—Pt-based alloy materials. Since these alloys have high crystal magnetic anisotropic energy, the thermal decay resistance often rises. Additive elements such as Ta, Cu, B, Cr, and Nd can be added, if necessary, to these alloys in order to improve the magnetic characteristics.

In some embodiments, it is possible to use, e.g., CoCrPt, CoCrPtB, CoCrPtTa, CoCrPtNd, or CoCrPtCu as the magnetic crystal grain material of the perpendicular magnetic recording layer.

A compound such as an oxide, nitride, or carbide can be used as the material forming the grain boundary region. These compounds easily precipitate because they hardly form solid solutions with the magnetic crystal grain materials described above. Practical examples are $SiO_x$, $TiO_x$, $CrO_x$, $AlO_x$, $MgO_x$, $TaO_x$, $YO_x$, $TiN_x$, $CrN_x$, $SiN_x$, $AlN_x$, $TaN_x$, $SiC_x$, $TiC_x$, and $TaC_x$.

The material forming the grain boundary region can be either crystalline or amorphous.

In one embodiment, the material forming the grain boundary region can be added at a molecular number ratio of 1% to 50% (inclusive) to the magnetic crystal grain material. If the molecular number ratio is less than 1%, the magnetic isolation between the magnetic crystal grains tends to become insufficient. If the molecular number ratio exceeds 50%, the (0001) alignment of the magnetic crystal grains tends to deteriorate.

Whether the perpendicular magnetic recording layer has the granular structure can be checked by observing the perpendicular magnetic recording layer plane by using, e.g., a transmission electron microscope. It is also possible to identify the elements and evaluate the compositions in the crystal grain portion and grain boundary region by using energy dispersion X-ray spectroscopy (EDX) together.

The perpendicular magnetic recording layer can have a multilayered structure made up of two or more layers if necessary. In this case, at least one layer can be a magnetic layer containing, e.g., Co as a main component, and containing crystal grains having the hexagonal close-packed structure substantially aligned in the (0001) plane. In one embodiment, at least one layer forming the perpendicular magnetic recording layer can be a magnetic layer having the granular structure.

As the method of downsizing the crystal grains in the perpendicular magnetic recording layer, as described previously, it is possible to use the method of adding $SiO_2$ or the like to the perpendicular magnetic recording layer, and the method of downsizing the crystal grains in the underlayer by adding $SiO_2$ or the like to the underlayer, thereby further downsizing the crystal grains in the recording layer. At present, however, the downsizing effects of these methods have reached their limits. In addition, when the underlayer crystal grains are downsized by these methods, the crystallinity, particularly, the alignment of the underlayer crystal grains generally deteriorates. Consequently, the (0001) plane alignment of the perpendicular magnetic recording layer deteriorates, and this degrades the magnetic characteristics and recording/reproduction characteristics.

To solve the above problem, the present inventors made extensive studies, and have found that when a thin layer which contains Cu and nitrogen as main components and in which Cu is modified is formed as a second underlayer on a first underlayer containing Cu as a main component and having a face-centered cubic lattice structure substantially aligned in the (111) plane, it is possible to decrease the average crystal grain size in the perpendicular magnetic recording layer, and improve the (0001) plane alignment of the magnetic crystal grains in the perpendicular magnetic recording layer.

The method of the present invention does not directly downsize the Cu crystal grains in the first underlayer, and hence can improve the (0001) plane alignment of the magnetic crystal grains in the perpendicular magnetic recording layer without deteriorating the crystallinity of the Cu underlayer. Accordingly, the recording/reproduction characteristics can well improve.

The alignment plane of the crystal grains in each layer can be evaluated by a so-called θ-2θ method by using, e.g., a general X-ray diffraction apparatus (XRD). Also, the alignment dispersion can be evaluated by a full width at half maximum of a rocking curve, $\Delta\theta_{50}$.

In one embodiment, the (111) plane alignment of the Cu crystal grains sometimes improves when substrate heating is performed before and/or after the formation of the Cu underlayer.

An example of the method of forming the second underlayer containing Cu and nitrogen as main components on the first underlayer containing Cu as a main component is a method which forms a Cu underlayer, and exposes the surface of the Cu underlayer to a nitrogen plasma or nitrogen radicals to form a modified layer by doping nitrogen in Cu in the surface region of the Cu underlayer. It is also possible to perform so-called reverse sputtering which slightly sputters the Cu layer surface in a nitrogen atmosphere.

Whether the second underlayer containing Cu and nitrogen as main components exists in the surface region of the Cu underlayer can be checked by performing EDX and medium section observation using, e.g., a TEM together. This can also be checked by analyzing means such as secondary ion mass spectrometry (SIMS), Rutherford backscattering (RBS), X-ray photoelectron spectroscopy (XPS), Auger electron spectroscopy (AES), and a three-dimensional atom probe method.

The thickness of the second underlayer can be checked by observing the medium section by using, e.g., a TEM. When the second underlayer containing Cu and nitrogen as main components is formed, the composition and crystallinity in the Cu underlayer as the first underlayer are different from those in the modified layer as the second underlayer. Since this produces a contrast difference between the two layers in a sectional TEM image, the thickness of the second underlayer containing Cu and nitrogen as main components can be evaluated.

Also, a so-called perpendicular double-layered medium having a perpendicular magnetic recording layer on a high-permeability soft magnetic layer is obtained by forming the soft magnetic layer between the first underlayer and substrate. In this perpendicular double-layered medium, the soft magnetic layer horizontally passes the recording magnetic field from a magnetic head, e.g., a single pole head for magnetizing the perpendicular magnetic recording layer and returns the magnetic field to the magnetic head, i.e., performs a part of the function of the magnetic head. The soft magnetic layer can thus apply a steep sufficient perpendicular magnetic field to the magnetic field recording layer, thereby increasing the recording/reproduction efficiency.

Examples of the material for use in this soft magnetic layer are CoZrNb, FeSiAl, FeTaC, CoTaC, NiFe, Fe, FeCoB, FeCoN, FeTaN, and CoIr.

The soft magnetic layer can be a multilayered film including two or more layers. In this case, it is possible to use layers different in material, composition, and film thickness. It is also possible to form a three-layered structure by sandwiching a thin Ru layer between two soft magnetic layers.

Furthermore, a bias application layer such as a longitudinal hard magnetic film or antiferromagnetic film can be formed between the soft magnetic layer and substrate.

Figure 2:
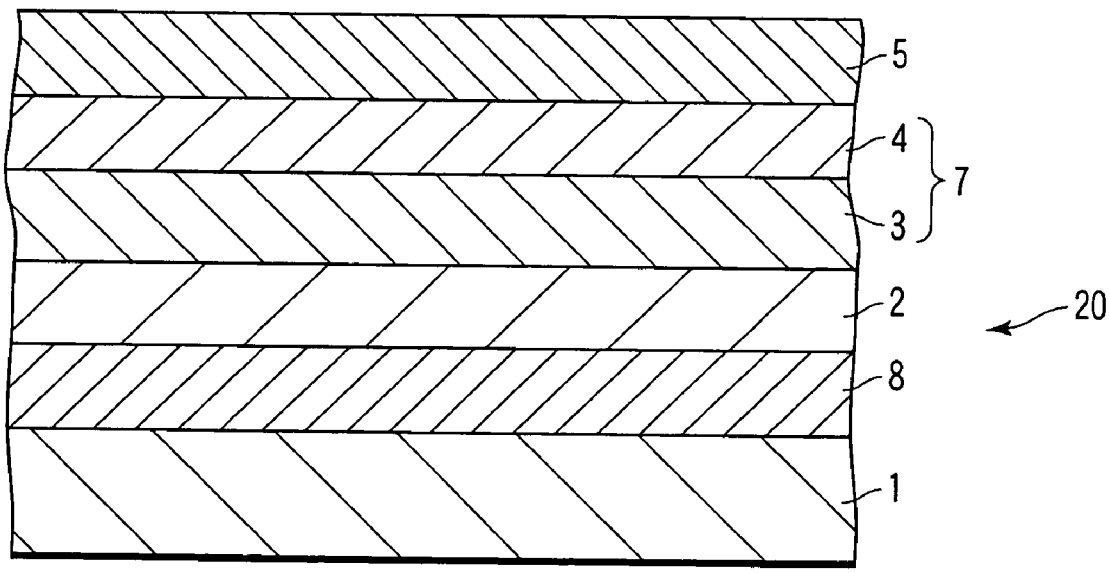
FIG. 2 is a sectional view showing the second example of the magnetic recording medium according to the present invention.

FIG. 2 is a sectional view showing the second example of the magnetic recording medium according to the present invention.

As shown in FIG. 2, a magnetic recording medium 20 has the same structure as FIG. 1 except that a bias application layer 8 is formed between a substrate 1 and soft magnetic layer 2.

The soft magnetic layer easily forms a magnetic domain, and this magnetic domain generates spike noise. Therefore, a magnetic field is applied in one direction in the radial direction of the bias application layer to apply a bias magnetic field to the soft magnetic layer formed on the bias application layer. It is also possible to give the bias application layer a stacked structure to finely disperse anisotropy, thereby preventing easy formation of a large magnetic domain. Examples of the bias application layer material are CoCrPt, CoCrPtB, CoCrPtTa, CoCrPtTaNd, CoSm, CoPt, FePt, CoPtO, CoPtCrO, CoPt—$SiO_2$, CoCrPt—$SiO_2$, CoCrPtO—$SiO_2$, FeMn, IrMn, and PtMn.

Examples of the nonmagnetic substrate are a glass substrate, an Al-based alloy substrate, an Si single-crystal substrate having an oxidized surface, ceramics, and plastic. In addition, similar effects can be expected even when the surface of any of these nonmagnetic substrates is plated with NiP alloy or the like.

A protective layer can be formed on the perpendicular magnetic recording layer.

Figure 3:
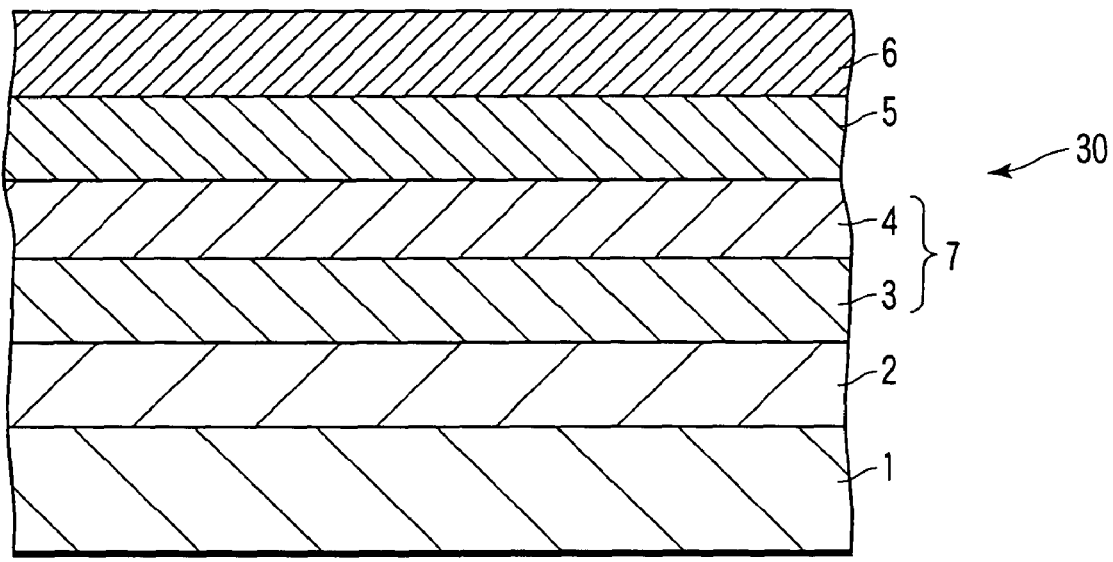
FIG. 3 is a sectional view showing the third example of the magnetic recording medium according to the present invention.

FIG. 3 is a sectional view showing the third example of the magnetic recording medium according to the present invention.

As shown in FIG. 3, a magnetic recording medium 30 has the same structure as FIG. 1 except that a protective layer 6 is formed on a perpendicular magnetic recording layer 5.

Examples of the protective layer are C, diamond-like carbon (DLC), $SiN_x$, $SiO_x$, and $CN_x$.

Each layer can be formed by vacuum vapor deposition, various sputtering methods, molecular beam epitaxy, ion beam vapor deposition, laser abrasion, and chemical vapor deposition.

In one embodiment, a second underlayer containing Cu and nitrogen as main components can have a thickness of 0.1 to 4 nm (inclusive). If the thickness is larger than 4 nm, the (0001) plane alignment of magnetic crystal grains in the perpendicular magnetic recording layer often deteriorates. If the thickness is smaller than 0.1 nm, the effect of decreasing the grain size of the magnetic crystal grains often becomes insignificant.

In one embodiment, a first underlayer can have a thickness of 0.5 to 100 nm (inclusive). If the thickness is less than 0.5 nm, the (0001) alignment of the magnetic crystal grains often deteriorates. If the thickness exceeds 100 nm, the recording resolution of the R/W characteristics often decreases.

In one embodiment, Cu metal grains contained in the first underlayer can have an average grain size of 1 nm or more. When the average crystal grain size in the Cu underlayer is 1 nm or more, the (0001) plane alignment of the magnetic crystal grains in the perpendicular magnetic recording layer can improve. In some embodiments, the average crystal grain size in the Cu underlayer can be 50 nm or more. In one embodiment, the first underlayer can be a single-crystal film having no crystal grain boundary. If the average crystal grain size of Cu is less than 1 nm, the (111) alignment of the Cu crystal grains deteriorates. This often degrades the (0001) plane alignment of the magnetic crystal grains in the perpendicular magnetic recording layer.

The average crystal grain size in each layer can be evaluated by, e.g., observing the plane of the layer by using a TEM. The present invention evaluates the areas of 200 crystal grains from a planar TEM image, approximates the radii of these crystal grains to those of circles having the same areas as the crystal grains, and uses the average of the radii of these circles as the average crystal grain size.

A layer having a structure in which metal grains having grain sizes smaller than those of the Cu crystal grains in the first underlayer are isolated in the form of islands can also be formed as a third underlayer on the second underlayer containing Cu and nitrogen as main components.

Figure 4:
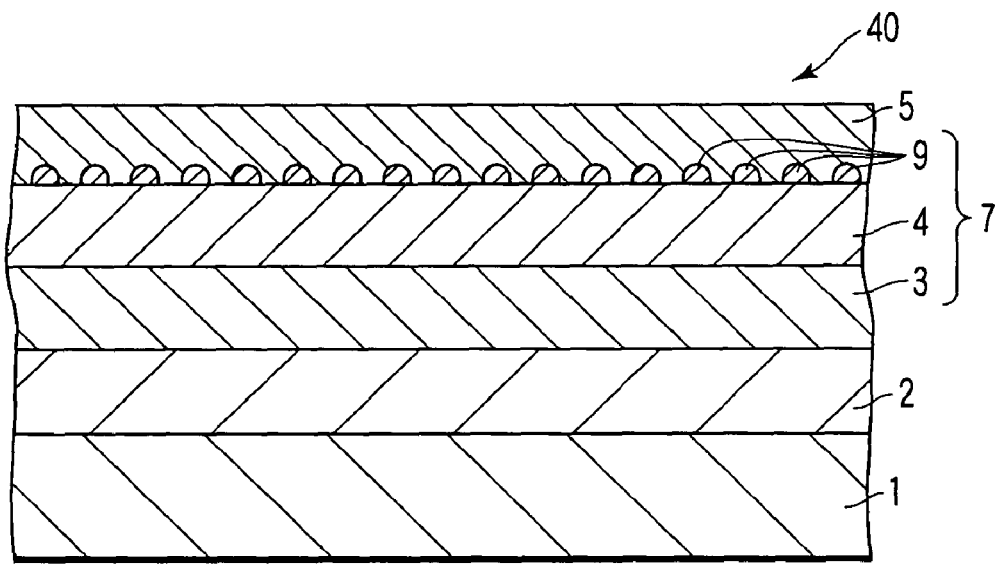
FIG. 4 is a sectional view showing the fourth example of the magnetic recording medium according to the present invention.

FIG. 4 is a sectional view showing the fourth example of the magnetic recording medium according to the present invention.

As shown in FIG. 4, a magnetic recording medium 40 has the same structure as FIG. 1 except that a third underlayer 9 having an island-like isolated structure is formed between a second underlayer 4 and perpendicular magnetic recording layer 5.

In one embodiment, the third underlayer having the structure in which metal grains are isolated in the form of islands can further decrease the grain size of magnetic crystal grains in the perpendicular magnetic recording layer. When at least one third underlayer like this is inserted, the metal grains interfere with the growth of crystal grains in a layer formed on the third underlayer, so the crystal grain size can decrease.

An example of the method of forming the third underlayer as described above is a method of depositing a very thin layer of an appropriate metal element on the second underlayer containing Cu and nitrogen as main components. In one embodiment, examples of the metal element are Ag, Au, Pt, Pd, Ir, Co, and Fe. These metal elements can easily form an island-like isolated structure on the second underlayer containing Cu and nitrogen as main components.

Whether the third underlayer has the island-like isolated structure can be checked by, e.g., observing the medium section by using a TEM.

In one embodiment, the average grain size in the third underlayer having the structure in which metal grains are isolated in the form of islands can be 0.1 to 1 nm (inclusive). If the average grain size is less than 0.1 nm, the effect of decreasing the grain size of the magnetic crystal grains in the perpendicular magnetic recording layer often becomes insignificant. If the average grain size exceeds 1 nm, the metal crystal grains often aggregate to form a continuous film, thereby increasing the grain size of the magnetic crystal grains in the perpendicular magnetic recording layer.

In one embodiment, the section observed using a TEM of the third underlayer having the structure in which metal grains are isolated in the form of islands can have a height of 0.1 to 1 nm (inclusive). The height of the third underlayer can be obtained by measuring, as heights, the diameters in the direction perpendicular to the film surface of 20 island-like metal grains by sectional TEM observation, and averaging the measured diameters.

If the height of the third underlayer having the structure in which the metal grains are isolated in the form of islands is smaller than 0.1 nm, the effect of decreasing the grain size of the magnetic crystal grains in the perpendicular magnetic recording layer often becomes insignificant. If the height is larger than 1 nm, the metal crystal grains often aggregate to form a continuous film, thereby increasing the grain size of the magnetic crystal grains in the perpendicular magnetic recording layer.

Furthermore, the crystal alignment of the perpendicular magnetic recording layer can be improved by inserting a nonmagnetic interlayer between the multilayered underlayer and perpendicular magnetic recording layer, e.g., between the third underlayer having the structure in which the metal grains are isolated in the form of islands and the perpendicular magnetic recording layer, or between the modified layer and perpendicular magnetic recording layer.

Figure 5:
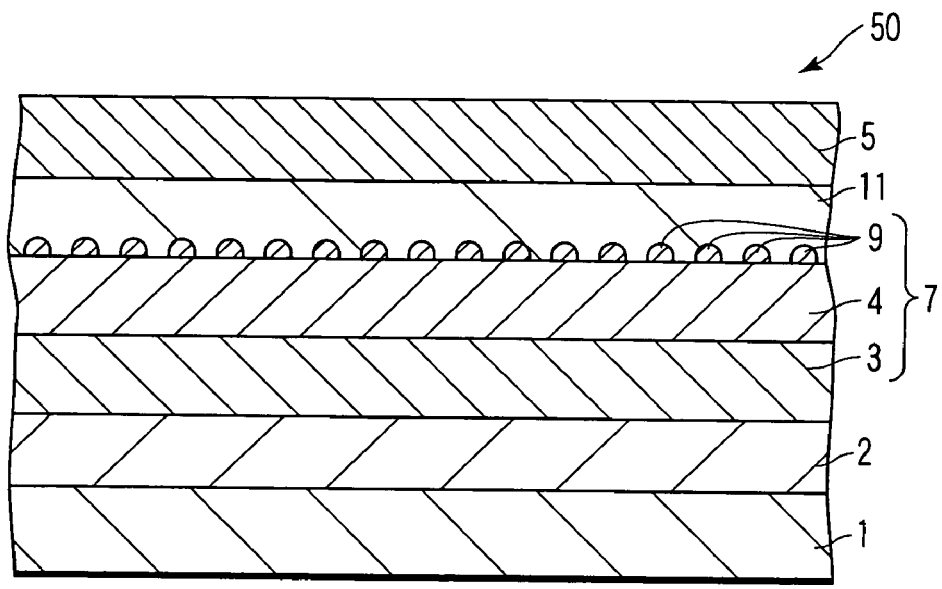
FIG. 5 is a sectional view showing the fifth example of the magnetic recording medium according to the present invention.

FIG. 5 is a sectional view showing the fifth example of the magnetic recording medium according to the present invention.

As shown in FIG. 5, a magnetic recording medium 50 has the same structure as FIG. 4 except that a nonmagnetic interlayer 11 is formed between a third underlayer 9 having a structure in which metal grains are isolated in the form of islands and a perpendicular magnetic recording layer 5.

An example of the nonmagnetic crystal material of the nonmagnetic interlayer is Ru or Ti aligned in a (0001) plane. These elements well lattice-match with the magnetic crystal materials described above, and can improve the crystal alignment of the perpendicular magnetic recording layer.

In one embodiment, a seed layer can be formed between a soft magnetic layer and Cu underlayer in order to improve the (111) plane alignment of crystal grains in the Cu underlayer. Examples of the material of this seed layer are Pt, Pd, Ni, NiFe, Co, Ti, and TiN. This alignment control underlayer need not be a layer in direct contact with the Cu underlayer.

Figure 6:
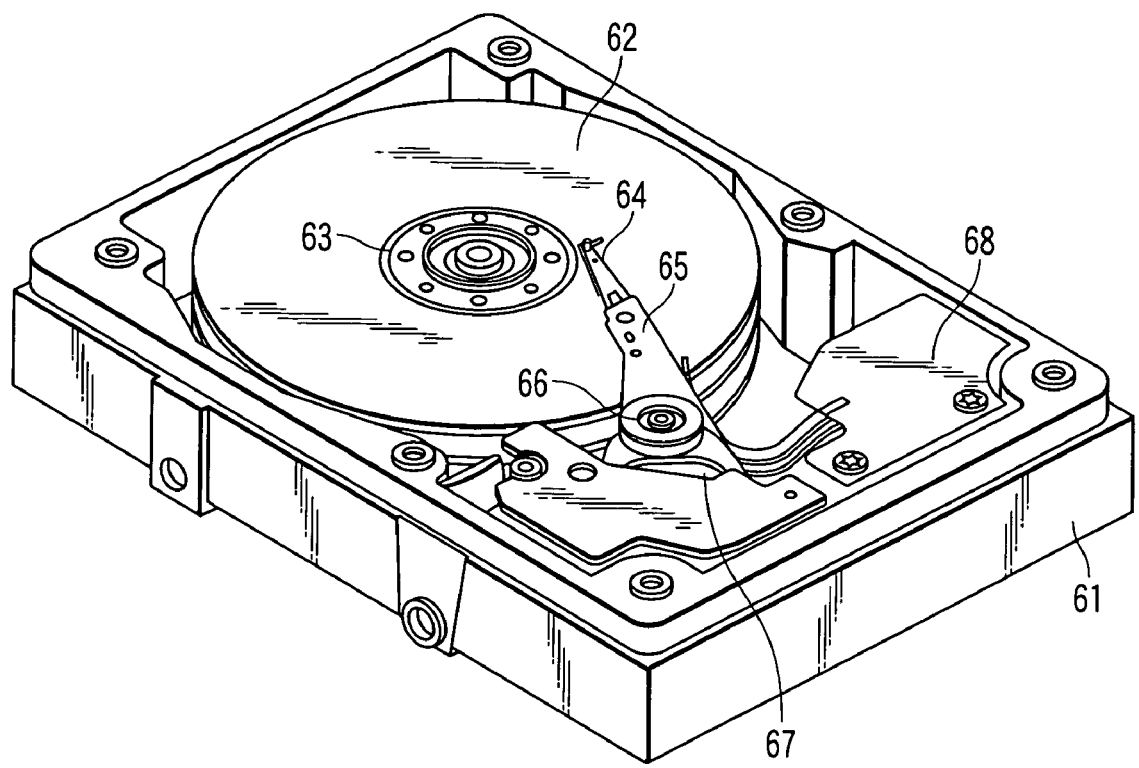
FIG. 6 is a partially exploded perspective view showing an example of a magnetic recording/reproducing apparatus of the present invention.

FIG. 6 is a partially exploded perspective view showing an example of a magnetic recording/reproducing apparatus of the present invention.

A rigid magnetic disk 61 for information recording according to the present invention is fitted on a spindle 62 and rotated at a predetermined rotational speed by a spindle motor (not shown). A slider 63 carrying a recording head for accessing the magnetic disk 61 to record information and an MR head for reproducing information is attached to the distal end of a suspension 64 which is a thin leaf spring. The suspension 64 connects to one end of an arm 65 having, e.g., a bobbin for holding a driving coil (not shown).

A voice coil motor 66 as a kind of a linear motor is attached to the other end of the arm 65. The voice coil motor 66 includes the driving coil (not shown) wound around the bobbin of the arm 65, and a magnetic circuit having a permanent magnet and counter yoke which oppose each other to sandwich the driving coil between them.

Ball bearings (not shown) formed in two, upper and lower portions of a fixed shaft 67 hold the arm 65, and the voice coil motor 66 pivots the arm 65. That is, the voice coil motor 66 controls the position of the slider 63 on the magnetic disk 61. Reference numeral 68 in FIG. 6 denotes a lid.

The present invention will be described in more detail below by way of its examples.

Example 1

A 2.5-inch nonmagnetic glass substrate (TS-10SX manufactured by ohara) having the shape of a hard disk was prepared.

This substrate was loaded into a vacuum chamber of a c-3010 sputtering apparatus manufactured by anelva.

After the vacuum chamber of the sputtering apparatus was evacuated to $1\times10^{-5}$ Pa or less, a 100-nm-thick $Co_{90}Zr_5Nb_5$ film was formed as a soft magnetic layer, and the substrate was heated to 180° C. by using an infrared lamp heater.

Then, a 15-nm thick Cu film was formed as a first underlayer on the soft magnetic layer.

After the formation of this Cu film, the Cu surface was reversely sputtered, and nitrogen was doped into the surface region of the Cu layer to form a second underlayer. The reverse sputtering to the Cu surface was performed by applying 70-W RF power to the Cu surface for 5 sec in a 3-Pa nitrogen ambient.

After that, a 15-nm-thick $(Co_{78}-Cr_{10}-Pt_{12})$-10 mol % $SiO_2$ film was formed as a perpendicular magnetic recording layer.

Subsequently, a 5-nm-thick C film was formed as a protective layer.

The surface of the protective layer was then coated with a 13-Å-thick perfluoropolyether (PFPE) lubricating agent to form a lubricating layer by dipping, thereby obtaining a magnetic recording medium.

The obtained magnetic recording medium had the same structure as FIG. 3 although FIG. 3 shows no lubricating layer.

Note that the $Co_{90}Zr_5Nb_5$, Cu, $(Co_{78}-Cr_{10}-Pt_{12})$-10 mol % $SiO_2$, and C films were formed by DC sputtering at Ar pressures of 0.7, 0.7, 5, and 0.7 Pa by using $Co_{90}Zr_5Nb_5$, Cu, $(Co_{78}-Cr_{10}-Pt_{12})$-10 mol % $SiO_2$, and C targets, respectively. The input power to each target was 1,000 W.

The fine structure of the obtained magnetic recording medium and an average crystal grain size dMag of the perpendicular magnetic recording layer were observed and measured on the plane and section by using a transmission electron microscope (TEM) at an acceleration voltage of 400 kV.

The distributions of Cu and nitrogen atoms in the direction of depth of each magnetic recording medium were measured by secondary ion mass spectrometry (SIMS) using $Cs^+$ ions.

The crystal alignment plane of each layer and an alignment dispersion $\Delta\theta_{50}$ in the (0001) plane of the crystal grains in the perpendicular magnetic recording layer were measured by a θ-2θ method and rocking curve, respectively, by using an X-ray diffraction apparatus X'pert-MRD manufactured by Philips of the Netherlands.

The R/W characteristic of the magnetic recording medium was checked by using a spin stand. A combination of a single pole head having a recording track width of 0.3 μm and an MR head having a reproduction track width of 0.2 μm was used as a magnetic head.

The measurement was performed in a fixed radial position of 20 mm while the disk was rotated at 4,200 rpm.

As a medium SNR, the value of a signal-to-noise ratio (SNRm) (S is the output at a linear recording density of 119 kfci, and Nm is the value of rms [root mean square] at 716 kfci) of a differential waveform having passed through a differentiating circuit was measured.

Table 1 below shows the average crystal grain size dMag of the perpendicular magnetic recording layer, the alignment dispersion $\Delta\theta_{50}$ in the (0001) plane of the perpendicular magnetic recording layer, and the R/W characteristic of the perpendicular magnetic recording medium.

Comparative Example 1

Following the same procedure as in Example 1, a soft magnetic layer was formed on a 2.5-inch nonmagnetic glass substrate having the shape of a hard disk.

A 10-nm thick Ta film, 5-nm-thick Pt film, and 20-nm thick Ru film were sequentially formed on the soft magnetic layer. Then, a 15-nm-thick $(Co_{78}-Cr_{10}-Pt_{12})$-10 mol % $SiO_2$ film was formed as a perpendicular magnetic recording layer, and a 5-nm-thick C protective layer was formed. After that, the surface was coated with a lubricating agent in the same manner as in Example 1.

Note that the $Co_{90}Zr_5Nb_5$, Ta, Pt, Ru, $(Co_{78}-Cr_{10}-Pt_{12})$-10 mol % $SiO_2$, and C films were formed by DC sputtering at Ar pressures of 0.7, 0.7, 0.7, 5, 5, and 0.7 Pa by using $Co_{90}Zr_5Nb_5$, Ta, Pt, Ru, $(Co_{78}-Cr_{10}-Pt_{12})$-10 mol % $SiO_2$, and C targets, respectively. The input power to each target was 1,000 W.

Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

Comparative Example 2

A perpendicular magnetic recording medium was obtained following the same procedures as in Comparative Example 1 except that Ru was changed to Ru-10 mol % $SiO_2$.

The Ru-10 mol % $SiO_2$ film was formed by DC sputtering at an input power of 1,000 W and an Ar pressure of 5 Pa by using an Ru-10 mol % $SiO_2$ target.

Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

Comparative Example 3

A perpendicular magnetic recording medium was manufactured following the same procedures as in Example 1 except that a Cu underlayer as a first underlayer was changed to a 15-nm-thick Ru underlayer.

After the Ru film was formed on a soft magnetic layer, reverse sputtering, perpendicular magnetic recording layer formation, protective layer formation, and lubricating agent coating were sequentially performed to obtain a magnetic recording medium.

Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

Comparative Example 4

A magnetic recording medium was manufactured following the same procedures as in Example 1 except that no reverse sputtering was performed on the Cu surface of a first underlayer.

Also, following the same procedures as in Example 1, the measurements using a TEM, SIMS, and X-ray diffraction apparatus and the R/W characteristic test were performed, and the dMag, $\Delta\theta_{50}$, and medium SNR were measured.

The inter-lattice distance was evaluated from diffraction spots obtained from selected-area electron beam diffraction patterns in planar and sectional TEM images of the crystal grains in the magnetic recording layers of Example 1 and Comparative Examples 1 to 4. Consequently, the crystal grains in the magnetic recording layers had a hexagonal close-packed structure.

Also, the inter-lattice distance was evaluated from diffraction spots obtained from selected-area electron beam diffraction patterns in planar and sectional TEM images of the Cu underlayers of Example 1 and Comparative Example 4. Consequently, the Cu crystal grains in the Cu underlayers had a face-centered cubic lattice structure.

Evaluations of Results by X-Ray Diffraction Apparatus (XRD)

The magnetic crystal grains in the magnetic recording layer of any of Example 1 and Comparative Examples 1 to 4 had the hcp structure and were aligned in the (0001) plane, i.e., perpendicularly aligned.

The Cu crystal grains in the Cu underlayer of each of Example 1 and Comparative Example 4 had the fcc structure and were aligned in the (111) plane.

Results of Planar TEM Observation

The perpendicular magnetic recording layer of the perpendicular magnetic recording medium of any of Example 1 and Comparative Examples 1 to 4 had a granular structure.

The results of sectional TEM observation indicates that a 1-nm thick second underlayer having a different contrast formed on the Cu underlayer of the medium of Example 1. By contrast, no such second underlayer was found in Comparative Examples 1 to 4.

Results of SIMS

In Example 1, a layer containing Cu and N as main components formed between the perpendicular magnetic recording layer and Cu underlayer. No such layer was found in the media of Comparative Examples 1 to 4.

Table 1 shows the average crystal grain size dMag, $\Delta\theta_{50}$, and SNR of the perpendicular magnetic recording layer of each magnetic recording medium.

TABLE 1

|  | dMag(nm) | $\Delta\theta_{50}(°)$ | SNR(dB) |
| --- | --- | --- | --- |
| Example 1 | 7.9 | 5.0 | 17.0 |
| Comparative Example 1 | 9.1 | 6.1 | 14.3 |
| Comparative Example 2 | 8.6 | 7.0 | 14.0 |
| Comparative Example 3 | 9.5 | 6.0 | 13.6 |
| Comparative Example 4 | 10.0 | 5.1 | 13.1 |

A comparison of Example 1 with Comparative Examples 1 and 2 shows that the perpendicular magnetic recording medium of the present invention was superior to the conventional media in any of decrease in the average crystal grain size dMag, decrease in the alignment dispersion $\Delta\theta_{50}$, and increase in the SNR of the perpendicular magnetic recording layer.

A comparison of Example 1 with Comparative Example 3 shows that when the Cu underlayer was replaced with the Ru underlayer, neither the effect of noticeably decreasing the average crystal grain size dMag nor the remarkable increase in SNR was obtained unlike in the present invention.

A comparison of Example 1 with Comparative Examples 4 and 5 demonstrates that when no second underlayer containing Cu and N as main components was formed on the Cu underlayer, neither the effect of conspicuously decreasing the average crystal grain size dMag nor the notable increase in SNR was obtained unlike in the present invention.

Example 2

Media were manufactured following the same procedures as in Example 1 except that the reverse sputtering time was changed from 1 to 120 sec. Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

The inter-lattice distance was evaluated from diffraction spots obtained from selected-area electron beam diffraction patterns in planar and sectional TEM images of the crystal grains in magnetic recording layers. Consequently, the crystal grains in the magnetic recording layers had a hexagonal close-packed structure.

Also, the inter-lattice distance was evaluated from diffraction spots obtained from selected-area electron beam diffraction patterns in planar and sectional TEM images of Cu underlayers. Consequently, the Cu crystal grains in the Cu underlayers had a face-centered cubic lattice structure.

Results of XRD Measurements

The magnetic crystal grains in the magnetic recording layer of each perpendicular magnetic recording medium had the hcp structure and were aligned in the (0001) plane.

The Cu crystal grains in the Cu underlayer of each perpendicular magnetic recording medium had the fcc structure and were aligned in the (111) plane.

Results of Planar TEM Observation

The perpendicular magnetic recording layer of each perpendicular magnetic recording medium had a granular structure.

Results of Sectional TEM Observation

The thickness of a second underlayer on the Cu underlayer changed from 0 to 14 nm (inclusive) in accordance with the reverse sputtering time.

Results of SIMS

A layer containing Cu and N as main components was formed between the perpendicular magnetic recording layer and Cu underlayer.

Figure 7:
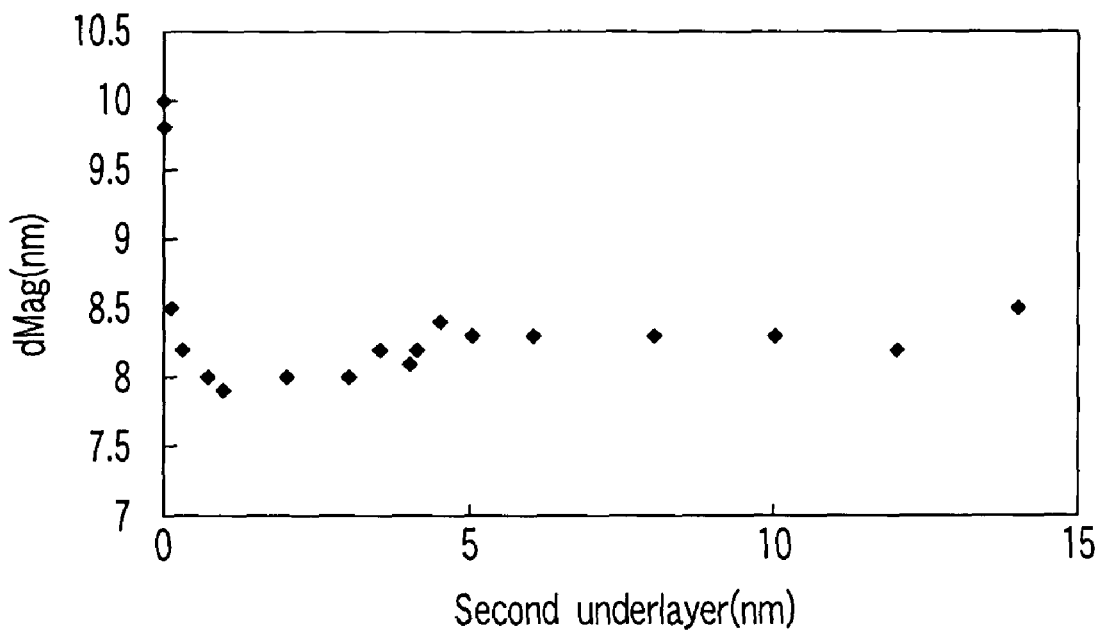
FIG. 7 is a graph showing the relationship between the thickness of a second underlayer and dMag.
Figure 8:
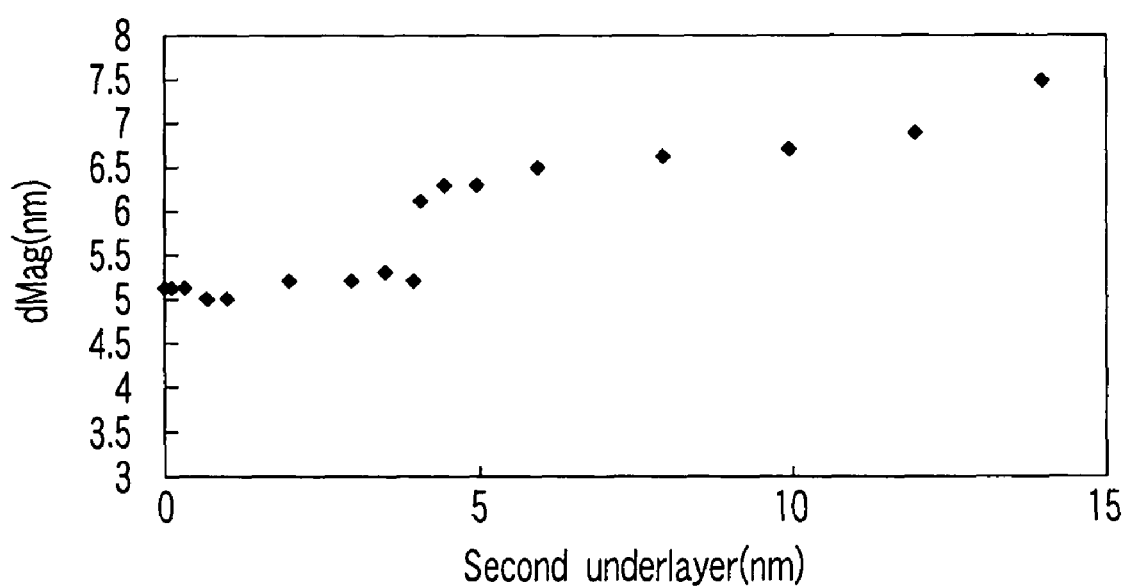
FIG. 8 is a graph showing the relationship between the thickness of the second underlayer and $\Delta\theta_{50}$.
Figure 9:
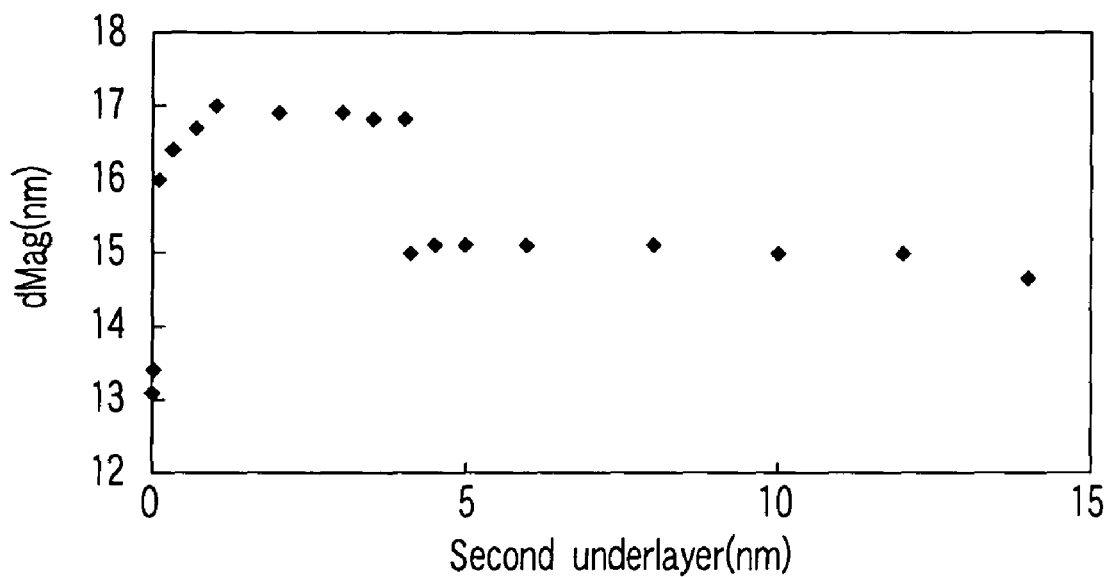
FIG. 9 is a graph showing the relationship between the thickness of the second underlayer and SNR.

FIGS. 7, 8, and 9 are graphs respectively showing the relationship between the thickness of the second underlayer containing Cu and N as main components and the dMag, the relationship between the thickness of the second underlayer containing Cu and N as main components and the $\Delta\theta_{50}$, and the relationship between the thickness of the second underlayer containing Cu and N as main components and the SNR.

As shown in FIGS. 7 to 9, the SNR noticeably increased when the thickness of the second underlayer containing Cu and N as main components was 0.1 to 4 nm (inclusive).

Example 3

A perpendicular magnetic recording medium was obtained following the same procedures as in Example 1 except that an Ag film was formed as a third underlayer on a second underlayer, and a perpendicular magnetic recording layer was formed after that in the same manner as in Example 1.

Figure 10:
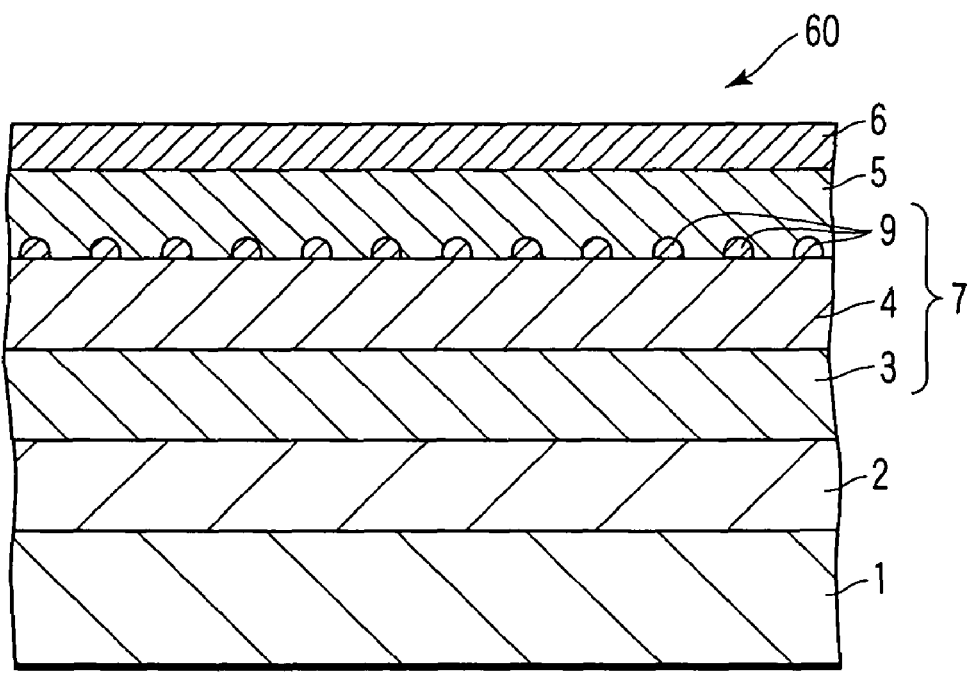
FIG. 10 is a sectional view showing the sixth example of the magnetic recording medium according to the present invention.

FIG. 10 is a sectional view schematically showing the structure of the obtained perpendicular magnetic recording medium.

As shown in FIG. 10, a perpendicular magnetic recording medium 60 had the same structure as FIG. 4 except that a protective layer 6 and a lubricating layer (not shown) were formed on a magnetic recording layer 5.

Note that the Ag third underlayer was formed by DC sputtering by using an Ag target at a film formation rate of 0.05 nm/s as a value for a continuous film for a film formation time of 4 sec.

In addition, media using Au, Pt, Pd, Ir, Co, and Fe instead of Ag as third underlayers were manufactured.

Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

Comparative Example 5

A perpendicular magnetic recording medium was obtained following the same procedures as in Comparative Example 1 except that an Ag film was formed as a third underlayer on an Ru layer in the same manner as in Example 3, and a magnetic recording layer was formed after that.

Media using Au, Pt, Pd, Ir, Co, and Fe instead of Ag as third underlayers were also manufactured.

Furthermore, following the same procedures as in Example 1, the measurements using a TEM, SIMS, and X-ray diffraction apparatus and the R/W characteristic test were performed, and the dMag, $\Delta\theta_{50}$, and medium SNR were obtained.

Comparative Example 6

A perpendicular magnetic recording medium was obtained following the same procedures as in Comparative Example 2 except that an Ag film was formed as a third underlayer on an Ru-10 mol % $SiO_2$ layer in the same manner as in Example 3, and a magnetic recording layer was formed after that.

Media using Au, Pt, Pd, Ir, Co, and Fe instead of Ag as third underlayers were also manufactured.

Furthermore, following the same procedures as in Example 1, the measurements using a TEM, SIMS, and X-ray diffraction apparatus and the R/W characteristic test were performed, and the dMag, $\Delta\theta_{50}$, and medium SNR were obtained.

Comparative Example 7

A perpendicular magnetic recording medium was obtained following the same procedures as in Comparative Example 3 except that an Ag film was formed as a third underlayer on an Ru layer in the same manner as in Example 3, and a magnetic recording layer was formed after that.

Media using Au, Pt, Pd, Ir, Co, and Fe instead of Ag as third underlayers were also manufactured.

Furthermore, following the same procedures as in Example 1, the measurements using a TEM, SIMS, and X-ray diffraction apparatus and the R/W characteristic test were performed, and the dMag, $\Delta\theta_{50}$, and medium SNR were obtained.

Comparative Example 8

A perpendicular magnetic recording medium was obtained following the same procedures as in Comparative Example 4 except that an Ag film was formed as a third underlayer on a Cu layer in the same manner as in Example 3, and a magnetic recording layer was formed after that.

Media using Au, Pt, Pd, Ir, Co, and Fe instead of Ag as third underlayers were also manufactured.

Furthermore, following the same procedures as in Example 1, the measurements using a TEM, SIMS, and X-ray diffraction apparatus and the R/W characteristic test were performed, and the dMag, $\Delta\theta_{50}$, and medium SNR were obtained.

The inter-lattice distance was evaluated from diffraction spots obtained from selected-area electron beam diffraction patterns in planar and sectional TEM images of the crystal grains in the magnetic recording layers. Consequently, the crystal grains in the magnetic recording layers had a hexagonal close-packed structure.

Also, the inter-lattice distance was evaluated from diffraction spots obtained from selected-area electron beam diffraction patterns in planar and sectional TEM images of the Cu underlayers. Consequently, the Cu crystal grains in the Cu underlayers had a face-centered cubic lattice structure.

Results of XRD Measurements

The magnetic crystal grains in the magnetic recording layer of each perpendicular magnetic recording medium had the hcp structure and were aligned in the (0001) plane.

The Cu crystal grains in the Cu underlayer of each of Example 3 and Comparative Example 8 had the fcc structure and were aligned in the (111) plane.

Results of Planar TEM Observation

The perpendicular magnetic recording layer of each perpendicular magnetic recording medium had a granular structure.

The results of sectional TEM observation indicate that a 1-nm-thick second underlayer having a different contrast formed on the Cu underlayer of the medium of Example 3. No such second underlayer was found in the other media.

Results of SIMS

A layer containing Cu and N as main components formed between the recording layer and Cu underlayer of the medium of Example 3. No such layer was found in the other media.

Results of Sectional TEM Observation

A 0.3-nm-thick layer made of Ag grains isolated in the form of islands formed between the second underlayer containing Cu and N as main components and the perpendicular magnetic recording layer of the medium of Example 3. The results of planar TEM observation indicate that the average crystal grain size in the Cu underlayer was about 12 nm. Since the average grain size of the Ag grains was smaller than that in the Cu underlayer, this layer was a third underlayer having a structure in which metal grains were isolated in the form of islands. Similar structures were found in the media in which the metal grains were Au, Pt, Pd, Ir, Co, and Fe. On the other hand, in the media of Comparative Examples 5, 6, 7, and 8, the third underlayer had a continuous film-like structure rather than an island-like isolated structure.

Table 2 below shows the average crystal grain size dMag, $\Delta\theta_{50}$, and SNR of the perpendicular magnetic recording layer of each magnetic recording medium.

TABLE 2

| | Third undercoating | dMag(nm) | $\Delta\theta_{50}(°)$ | SNR(dB) |
|---|---|---|---|---|
| Example 3 | Ag | 6.9 | 5 | 18 |
| Example 3 | Au | 7.3 | 5.3 | 17.7 |
| Example 3 | Pt | 7.4 | 4.7 | 17.7 |
| Example 3 | Pd | 7.4 | 4.8 | 17.6 |
| Example 3 | Ir | 7.4 | 4.7 | 17.3 |
| Example 3 | Co | 7.5 | 4.8 | 17.5 |
| Example 3 | Fe | 7.1 | 5.4 | 17.3 |
| Comparative Example 5 | Ag | 10.1 | 7.0 | 13.5 |
| Comparative Example 6 | Ag | 9.7 | 8.0 | 13.0 |
| Comparative Example 7 | Ag | 10.1 | 6.3 | 12.4 |
| Comparative Example 8 | Ag | 10.5 | 5.3 | 12.0 |

A comparison of Example 3 with Example 1 shows that the average crystal grain size dMag, $\Delta\theta_{50}$, and SNR of the perpendicular magnetic recording layer improved when the third underlayer having the structure in which the metal grains were isolated in the form of islands formed on the second underlayer containing Cu and N as main components.

A comparison of Example 3 with Comparative Examples 5 and 6 shows that no third underlayer having the structure in which the metal grains were isolated in the form of islands formed on the Ru or Ru—SiO$_2$ underlayer, so the average crystal grain size dMag, $\Delta\theta_{50}$, and SNR did not remarkably improve unlike in the present invention.

A comparison of Example 3 with Comparative Example 7 demonstrates that when the Ru underlayer was used instead of the Cu underlayer, neither the second underlayer containing Cu and N as main components nor the third underlayer having the structure in which the metal grains were isolated in the form of islands formed, so the dMag and SNR did not noticeably improve.

A comparison of Example 3 with Comparative Example 8 indicates that when no second underlayer containing Cu and N as main components formed on the Cu underlayer, no third underlayer having the structure in which the metal grains were isolated in the form of islands formed, so the dMag and SNR did not notably improve.

Example 4

Various perpendicular magnetic recording media were obtained following the same procedures as in Example 3 except that a third underlayer was deposited at a film formation rate of 0.05 nm/s as a value for a continuous film while the film formation time was changed from 0.5 to 25 sec (inclusive).

Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

The inter-lattice distance was evaluated from diffraction spots obtained from selected-area electron beam diffraction patterns in planar and sectional TEM images of the crystal grains in perpendicular magnetic recording layers. Consequently, the crystal grains in the magnetic recording layers had a hexagonal close-packed structure.

Also, the inter-lattice distance was evaluated from diffraction spots obtained from selected-area electron beam diffraction patterns in planar and sectional TEM images of Cu underlayers. Consequently, the Cu crystal grains in the Cu underlayers had a face-centered cubic lattice structure.

Results of XRD Measurements

The magnetic crystal grains in the magnetic recording layer of each perpendicular magnetic recording medium had the hcp structure and were aligned in the (0001) plane.

The Cu crystal grains in the Cu underlayer of each perpendicular magnetic recording medium had the fcc structure and were aligned in the (111) plane.

Results of Planar TEM Observation

The perpendicular magnetic recording layer of each perpendicular magnetic recording medium had a granular structure.

Results of Sectional TEM Observation

A 1-nm-thick second underlayer having a different contrast formed on the Cu underlayer of each medium.

Results of SIMS

A layer containing Cu and N as main components formed on the Cu underlayer of each medium.

Results of Sectional TEM Observation

In a medium in which the third underlayer material was Ag, an Ag third underlayer isolated in the form of islands formed on the second underlayer containing Cu and N as main components.

Similar structures were found in media in which the third underlayer materials were Au, Pt, Pd, Ir, Co, and Fe.

Figure 13:
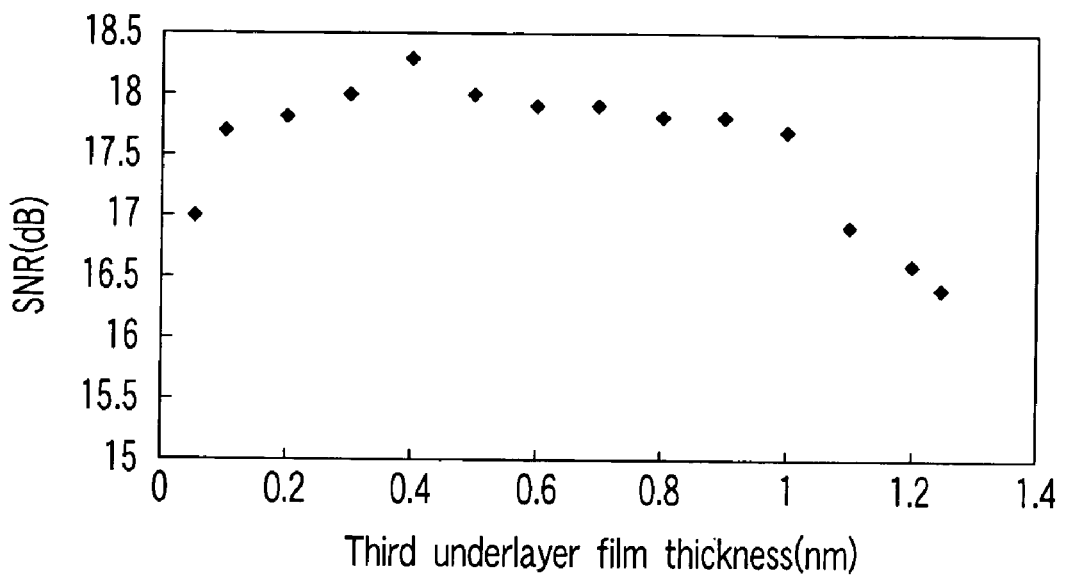
FIG. 13 is a graph showing the relationship between the thickness of the third underlayer and SNR.

FIGS. 11, 12, and 13 are graphs respectively showing the relationship between the thickness of the Ag third underlayer and the average crystal grain size dMag, the relationship between the thickness of the Ag third underlayer and the $\Delta\theta_{50}$, and the relationship between the thickness of the Ag third underlayer and the SNR.

In one embodiment, as shown in FIGS. 11 to 13, the dMag and SNR conspicuously improved when the thickness of the Ag third underlayer was 0.1 to 1 nm (inclusive). Similar tendencies were found in the media in which the third underlayers were made of Au, Pt, Pd, Ir, Co, and Fe.

Example 5

A perpendicular magnetic recording medium was obtained following the same procedures as in Example 1 except that a 20-nm-thick Ru film was formed as a nonmagnetic interlayer on a second underlayer, and a perpendicular magnetic recording layer was formed after that in the same manner as in Example 1.

Figure 14:
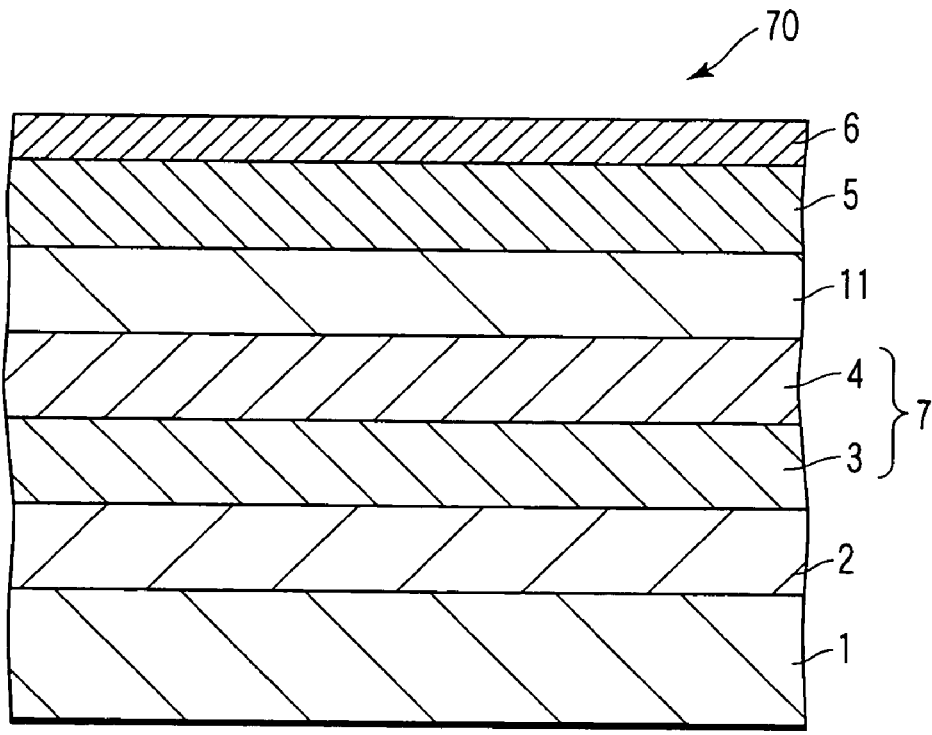
FIG. 14 is a sectional view showing the seventh example of the magnetic recording medium according to the present invention.

FIG. 14 is a sectional view schematically showing the structure of the obtained perpendicular magnetic recording medium.

As shown in FIG. 14, a perpendicular magnetic recording medium 70 had the same structure as FIG. 3 except that a nonmagnetic interlayer 11 was formed between a second underlayer 4 and magnetic recording layer 5, and a lubricating layer (not shown) was formed on a protective layer 6.

Note that the Ru interlayer was formed by DC sputtering by using an Ru target. The input power to the target was 1,000 W, and the Ar pressure during sputtering was 5 Pa. A medium using Ti instead of Ru as an interlayer was similarly manufactured.

Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

Comparative Example 9

A perpendicular magnetic recording medium was obtained following the same procedures as in Example 5 except that a 20-nm-thick Cr film was formed instead of an Ru film as an interlayer.

Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

The inter-lattice distance was evaluated from diffraction spots obtained from selected-area electron beam diffraction patterns in planar and sectional TEM images of the crystal grains in the perpendicular magnetic recording layers. Consequently, the crystal grains in the magnetic recording layers had a hexagonal close-packed structure.

Also, the inter-lattice distance was evaluated from diffraction spots obtained from selected-area electron beam diffraction patterns in planar and sectional TEM images of the Cu underlayers. Consequently, the Cu crystal grains in the Cu underlayers had a face-centered cubic lattice structure.

Furthermore, the inter-lattice distance was evaluated from diffraction spots obtained from selected-area electron beam diffraction patterns in planar and sectional TEM images of the Ru, Ti, and Cr interlayers. Consequently, the Ru and Ti crystal grains in the Ru and Ti interlayers had a hexagonal close-packed structure. On the other hand, the Cr crystal grains in the Cr interlayer had a body-centered cubic structure.

Results of XRD Measurements

The magnetic crystal grains in the perpendicular magnetic recording layer of the perpendicular magnetic recording medium of Example 5 had the hcp structure and were aligned in the (0001) plane. On the other hand, the magnetic crystal grains in the perpendicular magnetic recording layer of the perpendicular magnetic recording medium of Comparative Example 9 had the hcp structure but were not aligned in the (0001) plane.

The Ru and Ti crystal grains in the perpendicular magnetic recording medium of Example 5 had the hcp structure and were aligned in the (0001) plane.

The Cu crystal grains in the Cu underlayer of the perpendicular magnetic recording medium of Example 5 had the fcc structure and were aligned in the (111) plane.

Results of Planar TEM Observation

The perpendicular magnetic recording layer of each perpendicular magnetic recording medium had a granular structure.

The results of sectional TEM observation indicate that a 1-nm-thick second underlayer having a different contrast formed on the Cu underlayer of each medium.

The results of SIMS show that a layer containing Cu and N as main components formed on the Cu underlayer of each medium.

Table 3 below shows the average crystal grain size dMag, $\Delta\theta_{50}$, and SNR of the perpendicular magnetic recording layer of each magnetic recording medium.

TABLE 3

| | Interlayer | dMag(nm) | $\Delta\theta_{50}(°)$ | SNR(dB) |
|---|---|---|---|---|
| Example 5 | Ru | 7.9 | 3.6 | 18.5 |
| Example 5 | Ti | 7.7 | 3.8 | 18.4 |
| Comparative Example 9 | Cr | 11.2 | — | 10.0 |

A comparison of Example 5 with Example 1 shows that the $\Delta\theta_{50}$ and SNR remarkably improved when the Ru and Ti interlayers formed on the second underlayer containing Cu and N as main components.

A comparison of Example 5 with Comparative Example 9 shows that the perpendicular magnetic recording layer was not aligned in the (0001) plane when the Cr interlayer formed on the second underlayer containing Cu and N as main components.

Example 6

Various perpendicular magnetic recording media were obtained following the same procedures as in Example 3 except that an Ru interlayer similar to Example 5 was formed between a third underlayer formed into islands and a perpendicular magnetic recording layer. In addition, media using Ti instead of Ru as an interlayer were manufactured.

Each obtained perpendicular magnetic recording medium had the same structure as FIG. 4 except that a protective layer 6 and a lubricating layer (not shown) were formed on a magnetic recording layer 5.

Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

Comparative Example 10

A perpendicular magnetic recording medium was obtained following the same procedures as in Example 6 except that a 20-nm-thick Cr film was formed instead of an Ru film as an interlayer.

Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

The inter-lattice distance was evaluated from diffraction spots obtained from selected-area electron beam diffraction patterns in planar and sectional TEM images of the crystal grains in the magnetic recording layers. Consequently, the crystal grains in the magnetic recording layers had a hexagonal close-packed structure.

Also, the inter-lattice distance was evaluated from diffraction spots obtained from selected-area electron beam diffraction patterns in planar and sectional TEM images of Cu underlayers. Consequently, the Cu crystal grains in the Cu underlayers had a face-centered cubic lattice structure.

Furthermore, the inter-lattice distance was evaluated from diffraction spots obtained from selected-area electron beam diffraction patterns in planar and sectional TEM images of the Ru, Ti, and Cr interlayers. Consequently, the Ru and Ti crystal grains in the Ru and Ti interlayers had a hexagonal close-packed structure. On the other hand, the Cr crystal grains in the Cr interlayer had a body-centered cubic structure.

Results of XRD Evaluations

The magnetic crystal grains in the perpendicular magnetic recording layer of each perpendicular magnetic recording medium of Example 6 had the hcp structure and were aligned in the (0001) plane. However, the magnetic crystal grains in Comparative Example 10 had the hcp structure but were not aligned in the (0001) plane.

The Ru and Ti nonmagnetic crystal grains in each perpendicular magnetic recording medium had the hcp structure and were aligned in the (0001) plane. However, the Cr crystal grains in Comparative Example 10 had no hcp structure and were not aligned in the (0001) plane.

The Cu crystal grains in the Cu underlayer of each perpendicular magnetic recording medium had the fcc structure and were aligned in the (111) plane.

Results of Planar TEM Observation

The perpendicular magnetic recording layer of each perpendicular magnetic recording medium had a granular structure.

Results of Sectional TEM Observation

A 1-nm-thick second underlayer having a different contrast formed on the Cu underlayer of each medium.

Results of SIMS

A layer containing Cu and N as main components formed on the Cu underlayer of each medium.

Results of Sectional TEM Observation

A third underlayer isolated in the form of islands formed on the second underlayer containing Cu and N as main components of each medium.

Table 4 below shows the average crystal grain size dMag, $\Delta\theta_{50}$, and SNR of the perpendicular magnetic recording layer of each obtained magnetic recording medium.

TABLE 4

| | Third undercoating | Interlayer | dMag (nm) | Δθ₅₀ (°) | SNR (dB) |
|---|---|---|---|---|---|
| Example 6 | Ag | Ru | 6.9 | 4.5 | 19.5 |
| Example 6 | Au | Ru | 7.0 | 4.2 | 19.0 |
| Example 6 | Pt | Ru | 7.2 | 4.1 | 19.3 |
| Example 6 | Pd | Ru | 7.2 | 4.1 | 19.2 |
| Example 6 | Ir | Ru | 7.1 | 4.2 | 19.3 |
| Example 6 | Co | Ru | 7.2 | 4.1 | 19.4 |
| Example 6 | Fe | Ru | 6.9 | 4.5 | 18.8 |
| Example 6 | Ag | Ti | 6.8 | 4.6 | 19.4 |
| Example 6 | Au | Ti | 6.9 | 4.4 | 18.9 |
| Example 6 | Pt | Ti | 7.0 | 4.3 | 19.0 |
| Example 6 | Pd | Ti | 7.0 | 4.3 | 19.0 |
| Example 6 | Ir | Ti | 7.0 | 4.3 | 19.1 |
| Example 6 | Co | Ti | 6.9 | 4.2 | 19.2 |
| Example 6 | Fe | Ti | 7.0 | 4.7 | 18.7 |

A comparison of Example 6 with Example 3 shows that the $\Delta\theta_{50}$ and SNR improved when the Ru or Ti interlayer formed on the third underlayer having the structure in which the metal grains were isolated in the form of islands.

A comparison of Example 6 with Example 5 shows that the average crystal grain size dMag and SNR further improved when the third underlayer having the structure in which the metal grains were isolated in the form of islands formed between the second underlayer containing Cu and N as main components and the interlayer.

In Comparative Example 10, unlike in Example 6, the perpendicular magnetic recording layer was not aligned in the (0001) plane because the Cr interlayer formed on the third underlayer having the structure in which the metal grains were isolated in the form of islands.

Example 7

Perpendicular magnetic recording media were obtained following the same procedures as in Example 6 except that a 3-nm-thick Pd layer was formed as a seed layer between a substrate and soft magnetic layer, and Ru was used as an interlayer.

The Pd seed layer was formed by DC sputtering by using a Pd target. The input power to the target was 1,000 W, and the Ar pressure during sputtering was 0.7 Pa. Similarly, media using Pt, Ni, NiFe, Co, Ti, and TiN instead of Pd as seed layers were manufactured.

Figure 15:
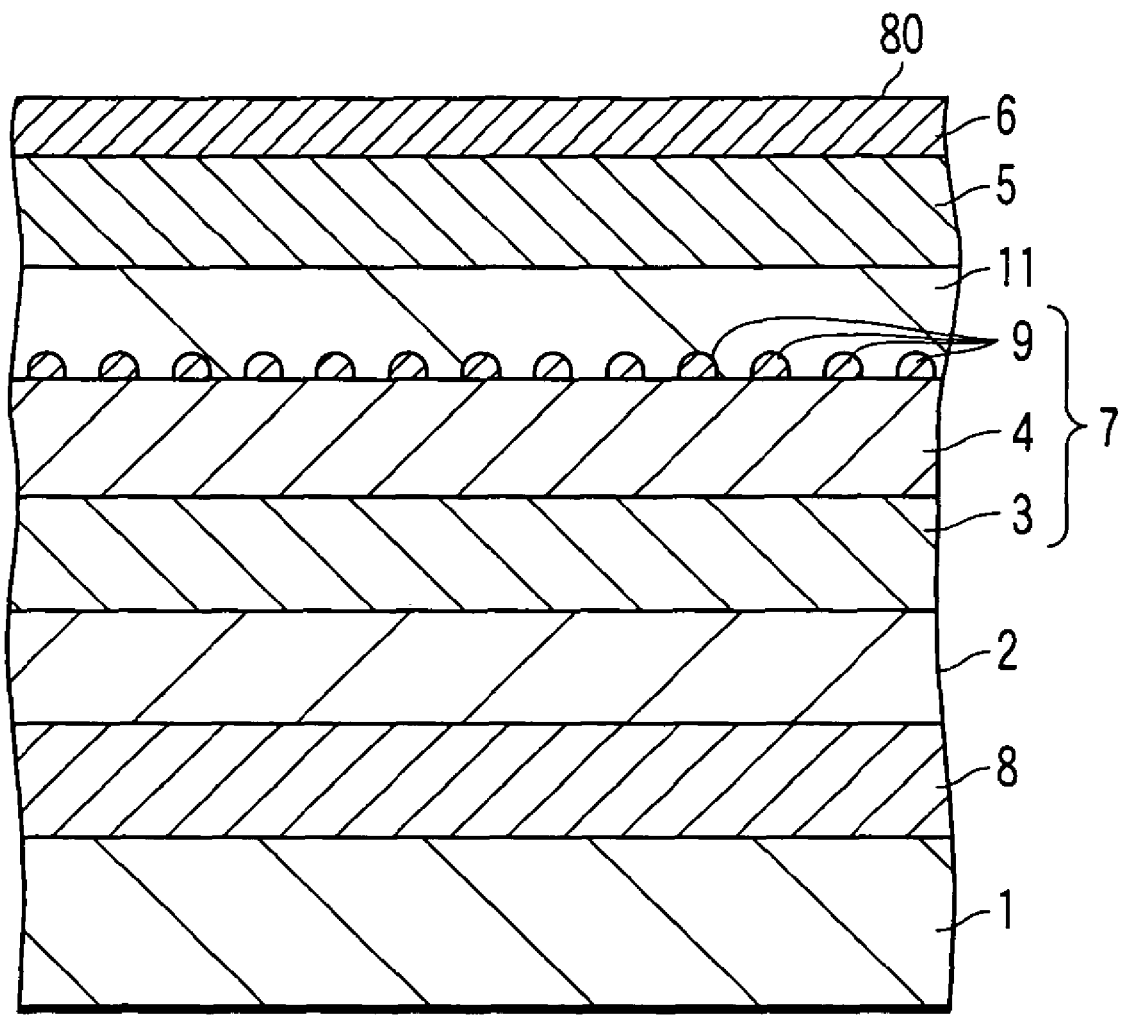
FIG. 15 is a sectional view showing the eighth example of the magnetic recording medium according to the present invention.

FIG. 15 is a sectional view schematically showing the structure of the obtained perpendicular magnetic recording medium.

As shown in FIG. 15, a perpendicular magnetic recording medium 80 had the same structure as FIG. 5 except that a seed layer 8 was formed between a substrate 1 and soft magnetic layer 2, and a protective layer 6 and a lubricating layer (not shown) were formed on a magnetic recording layer 5.

Also, following the same procedures as in Example 1, the measurements using a TEM, SIMS, and X-ray diffraction apparatus and the R/W characteristic test were performed, and the dMag, $\Delta\theta_{50}$, and medium SNR were obtained.

The inter-lattice distance was evaluated from diffraction spots obtained from selected-area electron beam diffraction patterns in planar and sectional TEM images of the crystal grains in the magnetic recording layers. Consequently, the crystal grains in the magnetic recording layers had a hexagonal close-packed structure.

Also, the inter-lattice distance was evaluated from diffraction spots obtained from selected-area electron beam diffraction patterns in planar and sectional TEM images of Cu underlayers. Consequently, the Cu crystal grains in the Cu underlayers had a face-centered cubic lattice structure.

Furthermore, the inter-lattice distance was evaluated from diffraction spots obtained from selected-area electron beam diffraction patterns in planar and sectional TEM images of the Ru interlayer. Consequently, the Ru crystal grains in the Ru interlayer had a hexagonal close-packed structure.

Results of XRD Measurements

The magnetic crystal grains in the perpendicular magnetic recording layer of each perpendicular magnetic recording medium had the hcp structure and were aligned in the (0001) plane.

The Ru crystal grains in each perpendicular magnetic recording medium had the hcp structure and were aligned in the (0001) plane.

The Cu crystal grains in the Cu underlayer of each perpendicular magnetic recording medium had the fcc structure and were aligned in the (111) plane.

Results of Planar TEM Observation

The perpendicular magnetic recording layer of each perpendicular magnetic recording medium had a granular structure.

Results of Sectional TEM Observation

A 1-nm-thick second underlayer having a different contrast formed on the Cu underlayer of each medium.

Also, a third underlayer isolated in the form of islands formed on the second underlayer containing Cu and N as main components in each medium.

Results of SIMS

A layer containing Cu and N as main components formed on the Cu underlayer of each medium.

Table 5 below shows the average crystal grain size dMag, $\Delta\theta_{50}$, and SNR of the perpendicular magnetic recording layer of each perpendicular magnetic recording medium using the Ag third underlayer and Ru interlayer obtained as described above.

TABLE 5

| | Seed layer | Third undercoating | Interlayer | dMag (nm) | Δθ₅₀ (°) | SNR (dB) |
|---|---|---|---|---|---|---|
| Example 7 | Pd | Ag | Ru | 6.7 | 3.1 | 20.5 |
| Example 7 | Pt | Ag | Ru | 6.6 | 3.1 | 20.3 |
| Example 7 | Ni | Ag | Ru | 6.5 | 3.4 | 20.1 |
| Example 7 | NiFe | Ag | Ru | 6.7 | 3.3 | 20.8 |
| Example 7 | Co | Ag | Ru | 6.4 | 3.5 | 20.1 |
| Example 7 | Ti | Ag | Ru | 6.7 | 3.0 | 20.2 |
| Example 7 | TiN | Ag | Ru | 6.5 | 3.4 | 20.3 |

A comparison of Example 7 with Example 6 shows that the $\Delta\theta_{50}$ and SNR further improved when the Pd, Pt, Ni, NiFe, Co, Ti, or TiN seed layer was formed on the Cu underlayer. Similar effects were found in the medium using Au, Pt, Pd, Ir, Co, or Fe as the third underlayer having the structure in which the metal grains were isolated in the form of islands, and using Ti as the interlayer.

Example 8

Perpendicular magnetic recording media were obtained following the same procedures as in Example 7 except that $(Co_{78}-Cr_{10}-Pt_{12})$-10 mol % $TiO_2$, $(Co_{78}-Cr_{10}-Pt_{12})$-10 mol % $Cr_2O_3$, $(Co_{78}-Cr_{10}-Pt_{12})$-10 mol % $Al_2O_3$, $(Co_{78}-Cr_{10}-Pt_{12})$-10 mol % $Ta_2O_5$, $(Co_{78}-Cr_{10}-Pt_{12})$-10 mol % $Y_2O_3$, and $(Co_{78}-Cr_{10}-Pt_{12})$-10 mol % MgO were used instead of $(Co_{78}-Cr_{10}-Pt_{12})$-10 mol % $SiO_2$ as perpendicular magnetic recording layers.

The inter-lattice distance was evaluated from diffraction spots obtained from selected-area electron beam diffraction patterns in planar and sectional TEM images of the crystal grains in the perpendicular magnetic recording layers. Consequently, the crystal grains in the magnetic recording layers had a hexagonal close-packed structure.

Also, the inter-lattice distance was evaluated from diffraction spots obtained from selected-area electron beam diffraction patterns in planar and sectional TEM images of Cu underlayers. Consequently, the Cu crystal grains in the Cu underlayers had a face-centered cubic lattice structure.

Furthermore, the inter-lattice distance was evaluated from diffraction spots obtained from selected-area electron beam diffraction patterns in planar and sectional TEM images of Ru interlayers. Consequently, the Ru crystal grains in the Ru interlayers had a hexagonal close-packed structure.

Results of XRD Measurements

The magnetic crystal grains in the perpendicular magnetic recording layer of each perpendicular magnetic recording medium had the hcp structure and were aligned in the (0001) plane.

The Ru crystal grains in each perpendicular magnetic recording medium had the hcp structure and were aligned in the (0001) plane.

The Cu crystal grains in the Cu underlayer of each perpendicular magnetic recording medium had the fcc structure and were aligned in the (111) plane.

Results of Planar TEM Observation

The perpendicular magnetic recording layer of each perpendicular magnetic recording medium had a granular structure.

Results of Sectional TEM Observation

A 1-nm-thick second underlayer having a different contrast formed on the Cu underlayer of each medium. Also, a third underlayer isolated in the form of islands formed on a second underlayer containing Cu and N as main components.

Results of SIMS

A layer containing Cu and N as main components formed on the Cu underlayer of each medium.

Table 6 below shows the average crystal grain size dMag, $\Delta\theta_{50}$, and SNR of the perpendicular magnetic recording layer of each magnetic recording medium.

TABLE 6

|  | Perpendicular magnetic recording layer | dMag (nm) | $\Delta\theta_{50}$ (°) | SNR (dB) |
|---|---|---|---|---|
| Example 8 | $(Co_{78}Cr_{10}Pt_{12})$—10% $TiO_2$ | 5.9 | 3.6 | 20.4 |
| Example 8 | $(Co_{78}Cr_{10}Pt_{12})$—10% $Cr_2O_3$ | 6.5 | 3.3 | 20.7 |
| Example 8 | $(Co_{78}Cr_{10}Pt_{12})$—10% $Al_2O_3$ | 5.9 | 4.2 | 20.0 |
| Example 8 | $(Co_{78}Cr_{10}Pt_{12})$—10% $Ta_2O_5$ | 5.7 | 4.4 | 19.9 |
| Example 8 | $(Co_{78}Cr_{10}Pt_{12})$—10% $Y_2O_3$ | 5.8 | 4.4 | 19.8 |
| Example 8 | $(Co_{78}Cr_{10}Pt_{12})$—10% MgO | 5.7 | 4.5 | 19.5 |

Even when $(Co_{78}$—$Cr_{10}$—$Pt_{12})$-10 mol % $TiO_2$, $(Co_{78}$—$Cr_{10}$—$Pt_{12})$-10 mol % $Cr_2O_3$, $(Co_{78}$—$Cr_{10}$—$Pt_{12})$-10 mol % $Al_2O_3$, $(Co_{78}$—$Cr_{10}$—$Pt_{12})$-10 mol % $Ta_2O_5$, $(Co_{78}$—$Cr_{10}$—$Pt_{12})$-10 mol % $Y_2O_3$, and $(Co_{78}$—$Cr_{10}$—$Pt_{12})$-10 mol % MgO were used instead of $(Co_{78}$—$Cr_{10}$—$Pt_{12})$-10 mol % $SiO_2$ as perpendicular magnetic recording layers, the average crystal grain size dMag, $\Delta\theta_{50}$, and SNR noticeably improved compared to the conventional media. Similar effects were also found in media using Pd, Pt, Ni, Co, Ti, and TiN as seed layers, Au, Pt, Pd, Ir, Co, and Fe as third underlayers having the structure in which metal grains were isolated in the form of islands, and Ti as an interlayer.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording medium comprising:
   a substrate;
   a soft magnetic layer formed on the substrate;
   a multilayered underlayer comprising a first underlayer formed on the soft magnetic layer, containing copper as a main component, and containing crystal grains with a face centered cubic lattice structure substantially aligned in a (111) plane, a second underlayer formed on the first underlayer and containing copper and nitrogen as main components and a third underlayer having an islands structure of which grains are isolated each other on the second underlayer; and
   a perpendicular magnetic recording layer formed on the multilayered underlayer, containing cobalt as a main component, and containing crystal grains with a hexagonal close-packed structure aligned in a (0001) plane,
   wherein the second underlayer is formed by doping nitrogen in the surface region of the first underlayer, the third underlayer contains metal crystal grains containing at least one metal selected from the group consisting of silver, iridium, and iron, and an average grain size of a metal crystal grains is smaller than an average crystal grain size of the crystal grains in the first underlayer.

2. The medium according to claim 1, wherein a thickness of the second underlayer is 0.1 to 4 nm.

3. The medium according to claim 1, wherein a height of the third underlayer is 0.1 to 1 nm.

4. The medium according to claim 1, further comprising a nonmagnetic interlayer formed between the multilayered underlayer and the perpendicular magnetic recording layer, made of at least one of ruthenium and titanium, and containing crystal grains with a hexagonal close-packed structure substantially aligned in the (0001) plane.

5. The medium according to claim 1, further comprising a seed layer formed between the multilayered underlayer and the soft magnetic layer, and containing at least one material selected from the group consisting of platinum, palladium, nickel, nickel iron, cobalt, titanium, and titanium nitride.

6. The medium according to claim 1, wherein the perpendicular magnetic recording layer comprises magnetic crystal grains containing at least one of Co Cr alloy and Co Pt alloy as a main component, and a grain boundary region containing at least one of an oxide, a nitride, and a carbide as a main component.

7. A magnetic recording/reproducing apparatus comprising:
   a magnetic recording medium comprising
   a substrate,
   a soft magnetic layer formed on the substrate,
   a multilayered underlayer comprising a first underlayer formed on the soft magnetic layer, containing copper as a main component, and containing crystal grains with a face centered cubic lattice structure substantially aligned in a (111) plane, a second underlayer formed on the first underlayer and containing copper and nitrogen as main components and a third underlayer having an islands structure of which grains are isolated each other on the second underlayer, and a perpendicular magnetic recording layer formed on the multilayered underlayer, containing cobalt as a main component, and containing crystal grains with a hexagonal close-packed structure aligned in a (0001) plane; and a recording/reproducing head, wherein the second underlayer is formed by doping nitrogen in the surface region of the first underlayer, the third underlayer contains metal crystal grains containing at least one metal selected from the group consisting of silver, iridium, and iron, and an average grain size of the metal crystal grains is smaller than an average crystal grain size of the crystal grains in the first underlayer.

* * * * *